United States Patent
Franke et al.

(10) Patent No.: US 10,768,862 B2
(45) Date of Patent: Sep. 8, 2020

(54) EXTENDING EXISTING STORAGE DEVICES IN VIRTUALIZED ENVIRONMENTS

(71) Applicant: International Business Machines Corporation, Armonk, NY (US)

(72) Inventors: Hubertus Franke, Cortlandt Manor, NY (US); Davide Pasetto, Mount Kisco, NY (US); Hartmut Penner, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/564,832

(22) Filed: Sep. 9, 2019

(65) Prior Publication Data

US 2020/0019349 A1    Jan. 16, 2020

Related U.S. Application Data

(63) Continuation of application No. 16/290,352, filed on Mar. 1, 2019, which is a continuation of application
(Continued)

(51) Int. Cl.
*G06F 3/06* (2006.01)
*G06F 9/455* (2018.01)

(52) U.S. Cl.
CPC .......... *G06F 3/0664* (2013.01); *G06F 3/0605* (2013.01); *G06F 3/067* (2013.01);
(Continued)

(58) Field of Classification Search
CPC .... G06F 3/0605; G06F 3/0622; G06F 3/0631; G06F 3/0637; G06F 3/0664; G06F 3/067; G06F 9/45558; G06F 2009/45579
See application file for complete search history.

(56) References Cited

U.S. PATENT DOCUMENTS

| 8,392,623 B2 | 3/2013 | Subramanian et al. |
| 8,489,699 B2 * | 7/2013 | Goggin ................. G06F 9/4856 709/213 |

(Continued)

OTHER PUBLICATIONS

Jin et al., "Architectural Support for Secure Virtualization under a Vulnerable Hypervisor", Proceedings of the 44th Annual IEEE/ACM International Symposium on Microarchitecture, MICRO'11, Dec. 3-7, 2011, Porto Alegre, Brazil, pp. 272-283, (2011).
(Continued)

*Primary Examiner* — Eric T Oberly
(74) *Attorney, Agent, or Firm* — Scully, Scott, Murphy & Presser, P.C.; Kevin M. Jordan, Esq.

(57) ABSTRACT

A method, system and computer program product for providing a guest with access to a virtual storage on a physical storage using a peripheral component interface hub. In one embodiment, the method comprises the guest sending to the peripheral component interface hub a request to access the physical storage, the request including physical addresses of the physical storage, and the peripheral component interface hub sending specified information about the request to a hypervisor. This method further comprises the hypervisor determining whether to grant or to reject the request; and when the hypervisor grants the request, the hypervisor sending a configuration command to the peripheral component interface hub. This command includes a mapping of addresses from the physical storage to addresses from the virtual storage. In an embodiment, the peripheral component interface hub uses this mapping to replace the addresses in the request with translated virtual addresses.

20 Claims, 6 Drawing Sheets

Related U.S. Application Data

No. 15/943,204, filed on Apr. 2, 2018, now Pat. No. 10,248,360, which is a continuation of application No. 15/598,873, filed on May 18, 2017, now Pat. No. 9,940,072, which is a continuation of application No. 14/317,054, filed on Jun. 27, 2014, now Pat. No. 9,665,309.

(52) U.S. Cl.
CPC .......... *G06F 3/0622* (2013.01); *G06F 3/0631* (2013.01); *G06F 3/0637* (2013.01); *G06F 9/45558* (2013.01); *G06F 2009/45579* (2013.01)

(56) References Cited

U.S. PATENT DOCUMENTS

| | | | |
|---|---|---|---|
| 9,069,658 B2 | 6/2015 | Borchers et al. | |
| 9,983,832 B1 | 5/2018 | Mayatskikh | |
| 10,078,454 B2 | 9/2018 | Chawla et al. | |
| 10,379,751 B2 | 8/2019 | Schuster et al. | |
| 2011/0179413 A1 | 7/2011 | Subramanian et al. | |
| 2011/0239213 A1* | 9/2011 | Aswani | G06F 9/45558 718/1 |
| 2012/0102491 A1 | 4/2012 | Maharana | |
| 2012/0284712 A1 | 11/2012 | Nimmagadda et al. | |
| 2012/0297379 A1* | 11/2012 | Anderson | G06F 9/45558 718/1 |
| 2013/0138863 A1* | 5/2013 | Tsirkin | G06F 12/0284 711/6 |
| 2013/0155083 A1 | 6/2013 | McKenzie et al. | |
| 2014/0173600 A1 | 6/2014 | Ramakrishnan Nair | |
| 2014/0372719 A1* | 12/2014 | Lange | G06F 12/1491 711/163 |

OTHER PUBLICATIONS

List of IBM Patents or Patent Applications Treated as Related.

* cited by examiner

EXTENDING EXISTING STORAGE DEVICES IN VIRTUALIZED ENVIRONMENTS

CROSS-REFERENCE TO RELATED APPLICATIONS

This application is a continuation of copending U.S. patent application Ser. No. 16/290,352, filed Mar. 1, 2019, which is a continuation of U.S. patent application Ser. No. 15/943,204, filed Apr. 2, 2018, which is a continuation of U.S. patent application Ser. No. 15/598,873, filed May 18, 2017, which is a continuation of U.S. patent application Ser. No. 14/317,054, filed Jun. 27, 2014. The entire contents and disclosures of U.S. patent application Ser. Nos. 16/290,352, 15/943,204, 15/598,873 and 14/317,054 are hereby incorporated by reference herein.

BACKGROUND

This invention generally relates to using storage devices in virtualized environments.

With the increased use of software defined environments such as cloud computing and/or software defined datacenters, there is a need for efficient virtualization along all physical resources. The advantages of virtual machine technology have become widely recognized. Among these advantages is the ability to run multiple virtual machines on a single host platform. This can make better use of the capacity of the hardware, while still ensuring that each user enjoys the features of a "complete" computer. An additional benefit of virtualization, in some implementations, is greater security.

A virtual machine (VM) is a software abstraction, or "virtualization," of an actual physical computer system. Multiple virtual machines (VMs) can be installed on a physical host machine, referred to as a "host," which includes physical system hardware. The physical system hardware typically includes one or more physical processors and physical memory and various other physical devices, such as an input/output (IO) storage adapter to perform protocol conversions required to access a remote storage such as over a shared storage access network (SAN).

The virtual system hardware ordinarily includes one or more virtual processors, virtual memory, at least one virtual disk, and one or more virtual devices all of which may be implemented using software to configure physical components of a physical machine to emulate the virtual components. One or more layers of co-resident software components comprising a virtualization intermediary, e.g. a virtual machine monitor (VMM), hypervisor or some combination thereof acts to instantiate and provision VMs and to allocate host resources dynamically and transparently among the VMs so that their respective guest operating systems can run concurrently on a single physical machine.

Most all cloud computing environments heavily rely on virtualization of their resources. Well known are the technologies for central processing unit (CPU) virtualization, where many of the virtual machine concepts are now integrated into the processor architecture. Examples of these are dualities of page tables, interrupt routing, etc. This has significantly increased the performance of CPU virtualization and also contributed to the isolation properties among virtual machines that must be satisfied.

In contrast, storage I/O devices have seen limited attention for efficient sharing. In general, I/O devices are still managed indirectly by the hypervisor. Guest virtual machine interact through their device drivers to a virtual device that trapped into the hypervisor, where the storage function is then implemented against a storage device. In many cases, virtual disks (vdisks) are managed by the hypervisor as files. This leads to significant inefficiencies as disk I/O in the guest results in a trap into the hypervisor, where a full I/O stack then needs to be traversed to translate the block access to the vdisk to a file access request, ultimately leading to a block request on the real device.

BRIEF SUMMARY

A method, system and computer program product for providing a guest with access to a virtual storage on a physical storage using a peripheral component interface hub. In one embodiment, the method comprises the guest sending to the peripheral component interface hub a request to access the physical storage, the request including physical addresses of the physical storage and the peripheral component interface hub sending specified information about the request to a hypervisor. This method further comprises the hypervisor determining whether to grant or to reject the request from the guest; and when the hypervisor grants the request, the hypervisor sending a configuration command to the peripheral component interface hub, said configuration command including a mapping of addresses from the physical storage to addresses from the virtual storage.

In an embodiment, the peripheral component interface hub uses said mapping to replace the physical addresses in the request with translated virtual addresses.

In one embodiment, the peripheral component interface hub forwards the request from the guest, with the translated virtual addresses, to a storage controller, and the storage controller uses said translated virtual addresses to access the virtual storage to respond to the request from the guest.

In one embodiment, the physical storage includes multiple physical storage devices.

In an embodiment, the peripheral component interface hub includes a plurality of virtual function; and the request to access the physical storage is sent to one of the virtual functions of the peripheral component interface hub.

In one embodiment, the peripheral component interface hub further includes at least one physical function, and the specified information about the request is sent to the hypervisor from the at least one physical function.

In an embodiment, the peripheral component interface hub includes a mechanism to provide mapping within the peripheral component interface hub to virtualize disks behind multiple storage controllers.

In an embodiment, the peripheral component interface hub includes a mechanism to provide authentication of the guest to access the virtual storage controlled by the peripheral component interface hub.

In one embodiment, the guest sends an authentication key to the peripheral component interface hub to authenticate the guest to the peripheral component interface hub.

In an embodiment, the guest sends to the peripheral component interface hub another request to access the physical storage, said another request including the authentication key of the guest; and in response to said another request, the peripheral component interface hub enables the guest to access the virtual storage without intervention of the hypervisor.

Embodiments of the invention allow a guest to access a vdisk that is located on the host without incurring additional overhead, yet maintain the isolation requirements and quality of service (QoS) enforcements that a hypervisor executed 110 stack provides.

Embodiments of the invention provide a Peripheral Component Interface (PCI) hub solution able to expose multiple virtual functions, one for each guest operating system running, and to translate accessed into standard disk 10 requests for traditional disk controllers.

DETAILED DESCRIPTION

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
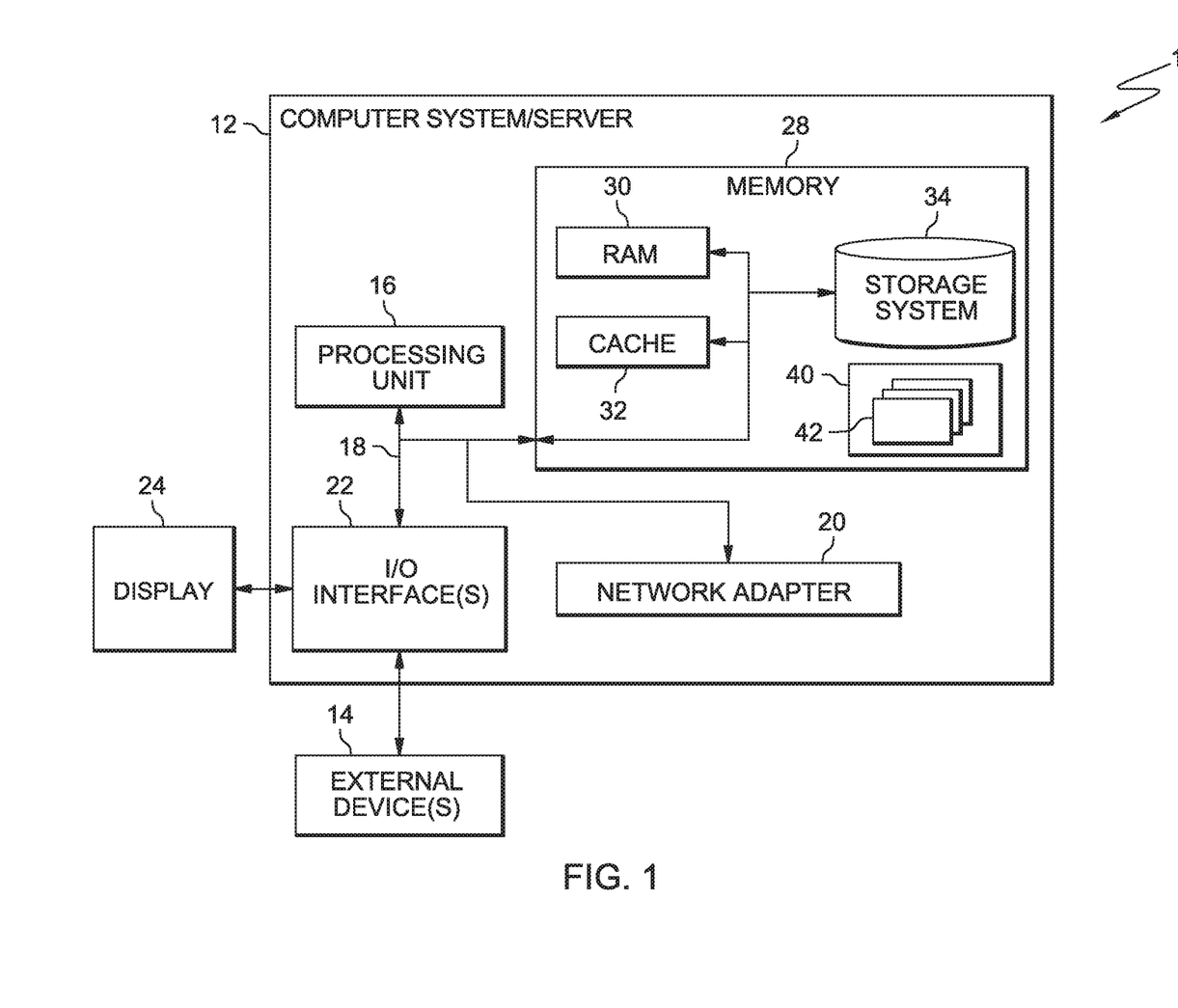
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
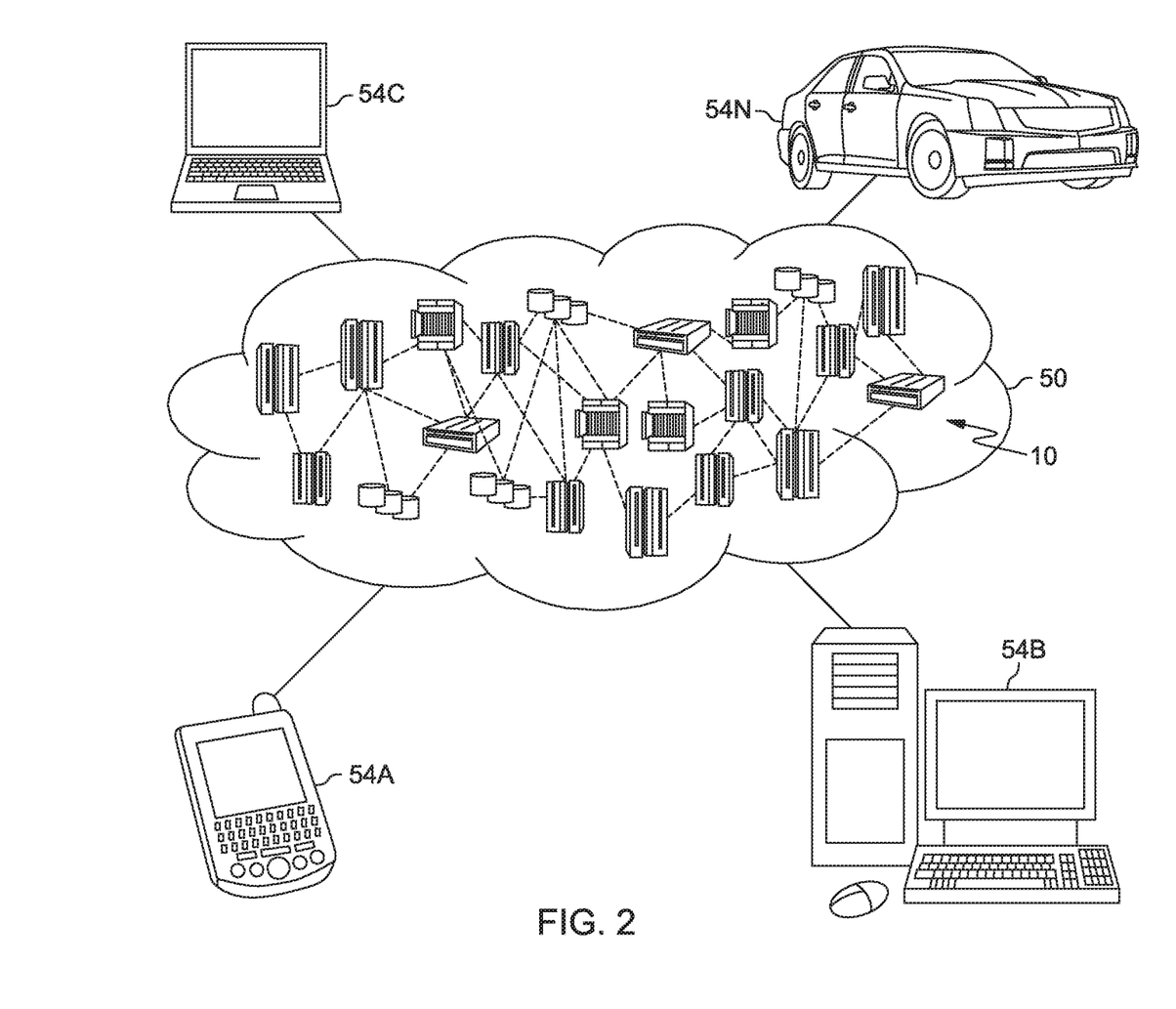
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
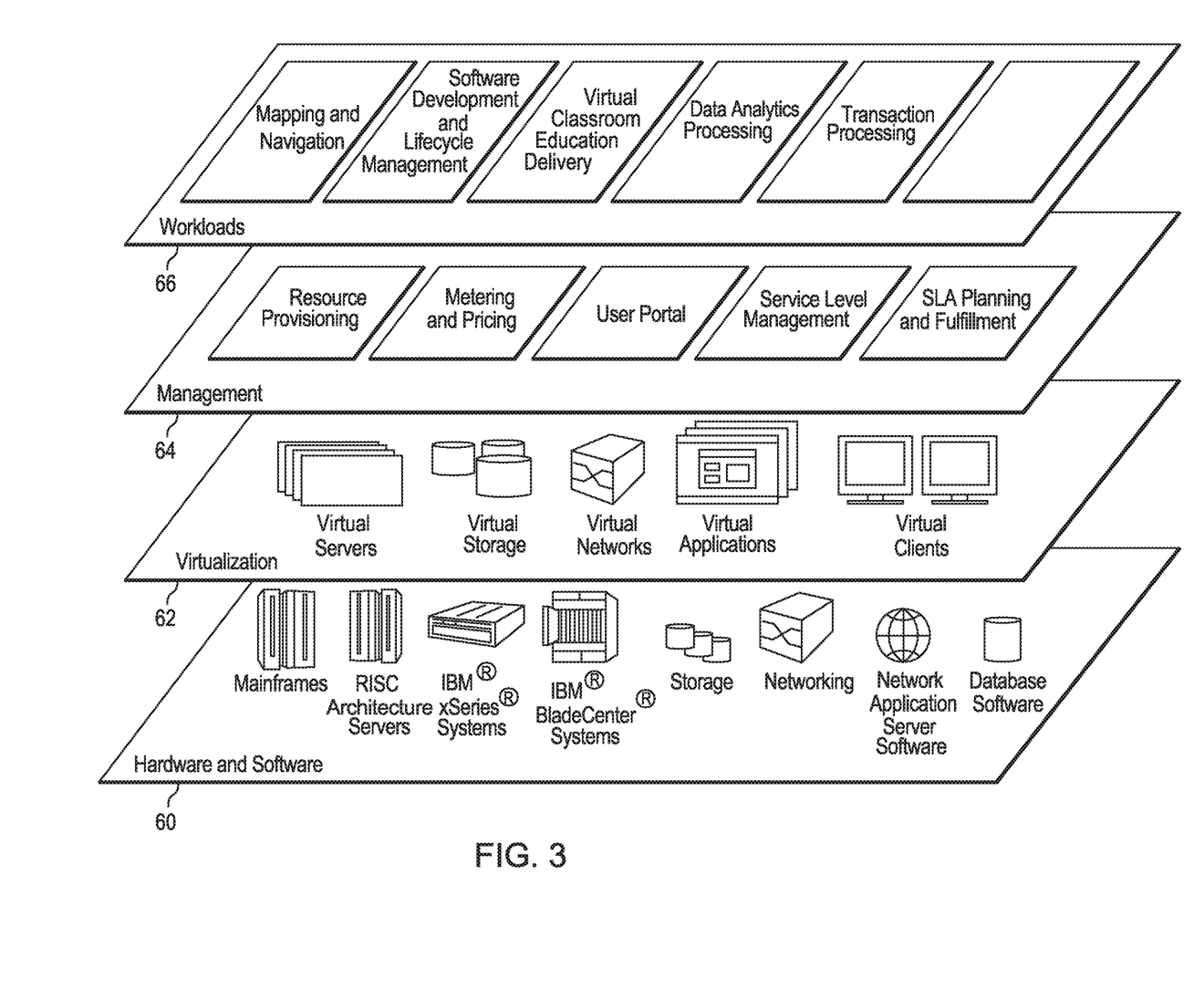
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and correlation based adaptive network monitoring.

Figure 4:
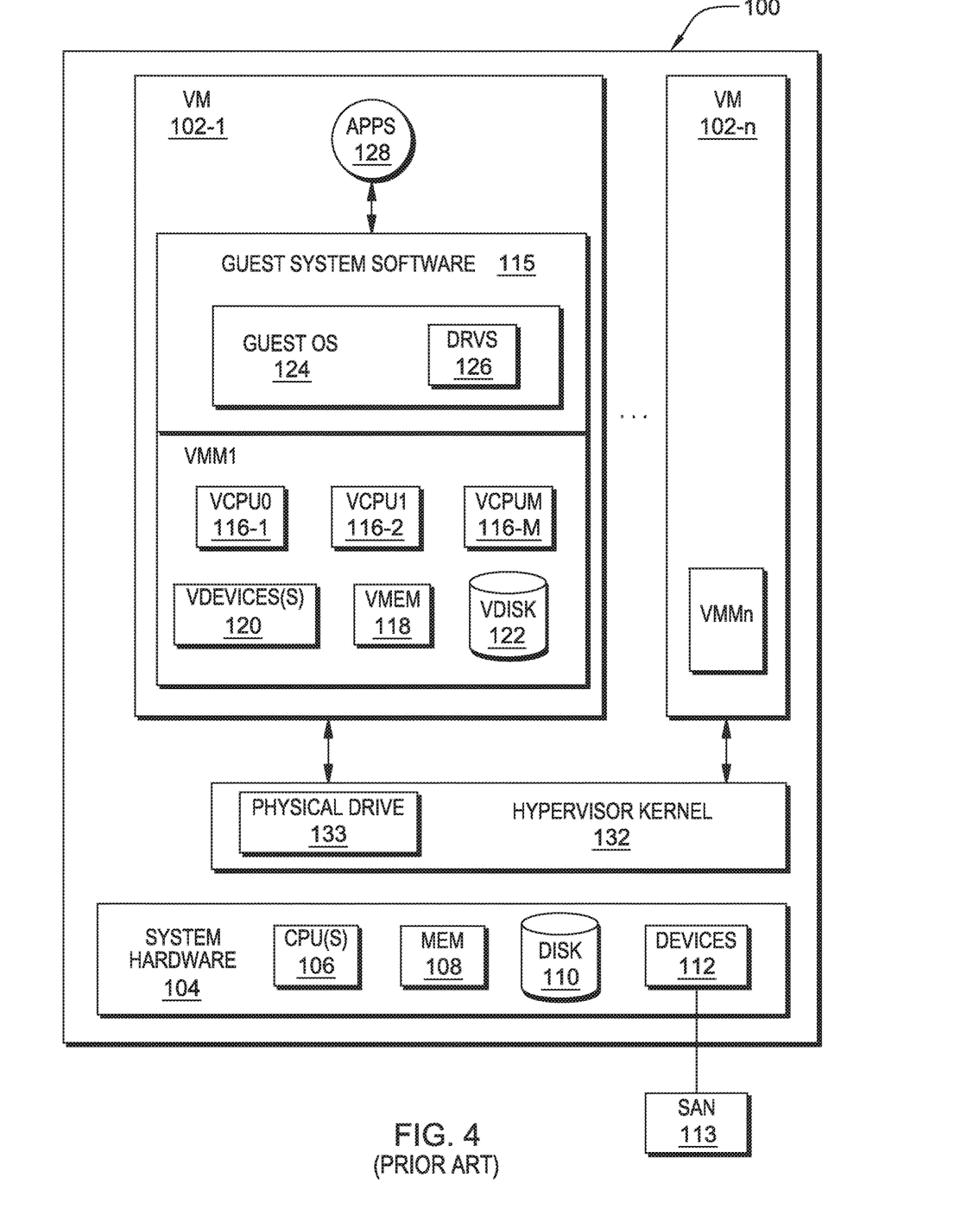
FIG. 4 illustrates a computer system that implements virtualization and with which embodiments of the invention may be used.

Embodiments of the invention provide a method, system and computer program product for using storage in a virtualized environment. FIG. 4 is an illustrative drawing showing one possible arrangement of a computer system 100 that implements virtualization and in which or with which embodiments of the invention may be implemented. In the example system of FIG. 4, multiple virtual machines (VMs) or "guests" VM1 to VMn are installed on a "host platform," referred to as a "host," which includes system hardware, that is, hardware platform 104, and one or more layers of co-resident software components comprising a virtualization intermediary, e.g. a virtual machine monitor (VMM), hypervisor or some combination thereof. The system hardware typically includes one or more physical processors 106, physical memory 108, some form of mass storage 110, and various other physical devices 112, such as an TO storage adapter to perform protocol conversions required to access remote storage such as within a storage access network (SAN) 113 and to coordinate concurrent accesses to such storage.

Each virtual machine VM1 to VMn typically will have both guest system software 115 and virtual system hardware, which typically includes one or more virtual CPUs (VCPUs) 116-1 to 116-$m$, virtual memory 118, at least one virtual disk 122, and one or more virtual devices 120. The virtual hardware components of the virtual machine may be implemented in software using known techniques to emulate the corresponding physical components. The guest system software includes guest operating system (OS) 124 and virtual drivers 126 as needed for the various virtual devices 120.

As is well known to persons skilled in the art, a typical device driver is a computer program based component that runs on (i.e. configures) a machine (e.g. host computer) and acts as a translator between a physical device and the applications or operating systems that use the device. A device driver typically accepts generic high-level commands and breaks them into a series of low-level device-specific commands as required by the device being driven. A virtual driver 126 is a computer program based component that runs on a host computer and performs the same role as a physical driver except that it configures a machine (e.g. host computer) to provide translation between a virtual device 120 that provides hardware emulation and that runs within the VMM and the guest operating system 124. Furthermore, drivers (virtual or physical) can provide a level of security as they can run in kernel-mode, thereby protecting the operating system from applications running in user-mode.

In many cases, software applications 128 running on a virtual machine VM1 will function as they would if run on a "real" computer, even though the applications are running at least partially indirectly, that is via guest operating system (OS) 124 and virtual processor(s). Executable files will be accessed by the guest OS from virtual disk 122 or virtual memory 118, which will correspond to portions of an actual physical disk 110 or storage on the SAN 113 or memory 108 allocated to that virtual machine.

In embodiments of the invention, the hypervisor signifies a software layer implemented to manage physical resources, process creation, I/O stacks, and that includes physical device drivers 133 (only one shown) that serve as an interface to host system devices such as an IO storage adapter. Under such an implementation, the hypervisor 132 would manage the selections of physical devices and their temporary assignment to virtual devices. For example, the hypervisor kernel 132 would manage the mapping between VM1-VMn and their virtual processors 116-1 to 116-$m$, virtual memory 118, and the physical hardware devices that are selected to implement these virtual devices.

More particularly, when a virtual processor is dispatched by a VM, a physical processor, such as one of the physical processors 104, would be scheduled by the hypervisor 132 to perform the operations of that virtual processor. In contrast, in the context of such implementation, VMM1-VMMn might be responsible for actually executing commands on physical processors, performing binary translation (BT) or programming of virtual hardware, for example.

The various virtualized hardware components of the VM1, such as VCPU(s) 116-1 to 116-$m$, virtual memory 118, virtual disk 122, and virtual device(s) 120, are shown as being emulated within VMM1, which runs within virtual machine VM1. One advantage of such an arrangement is that the virtual machine monitors VMM1 to VMMn may be set up to expose "generic" devices, which facilitate VM migration and hardware platform-independence. For example, the VMM1 may be set up to emulate a standard Small Computer System Interface (SCSI) disk, so that the virtual disk 122 appears to the VM1 to be a conventional SCSI disk connected to a conventional SCSI adapter, whereas the underlying, actual, physical disk 110 may be something else.

The term "disk" typically signifies persistently stored data addressed in sequence, typically from address zero to address max capacity−1. In that case, a conventional SCSI driver typically would be installed into the guest OS 124 as one of the virtual drivers 126. A virtual device 120 within the VMM then would provide an interface between VM1 and a physical device driver 133 within the hypervisor kernel 132 that serves as an interface to a physical device (e.g., device 112) that is part of the host system and would handle disk operations for the VM1.

The system of FIG. 4 is an example of a non-hosted configuration in which VMMs are deployed on top of a software layer—hypervisor kernel 132—constructed specifically to provide an interface for the virtual machines. Kernel 132 also may handle any other applications running on it that can be separately scheduled, as well as a console operating system that, in some architectures, is used to boot the system and facilitate certain user interactions with the virtualization software.

PCI SR-IOV

Many modern computing devices employ input/output (IO) adapters and buses that utilize some version or implementation of the Peripheral Component Interconnect (PCI) standard, which specifies a computer bus for attaching peripheral devices to a computer motherboard. PCI Express (PCIe) is an implementation of the PCI computer bus that uses existing PCI programming concepts, but bases the computer bus on a different and much faster serial physical-layer communications protocol. In addition to the PCI and PCIe specifications, the PCI-SIG has defined input/output virtualization (IOV) standards for defining how to design an IO adapter that can be shared by several virtual machines.

The term "function" is used in the PCI context to signify a device with access controlled by a PCI bus. A PCI function is identified within a single PCI root complex by its PCI or PCIe bus, device, and slot identifiers. A PCI function includes a configuration space, which includes both device dependent and device independent regions used by host software to support device relocation on the PCI bus, flexible device-to-interrupt binding, device identification, and device configuration. A function also includes memory space which is identified by Barrier Address Registers in configuration space and provides a memory mapped IO interface for host IO initiated from host to the device. A PCIe function also includes message space which is identified by MSI and MSI-X capabilities in configuration space and provides either or both MSI/MSI-X message based interrupt generation. Many network (e.g., Ethernet) and storage (e.g., disk) adapters are implemented as PCI or PCIe compliant adapters and are recognized by a machine's PCI sub-system as a single PCI function. Multi-port PCI or PCIe adapters simply appear to a host PCI sub-system as multiple PCI functions.

Embodiments of the invention provide virtual disk to a guest exploiting single root input output virtualization (SR-IOV). Techniques specified in the PCI SR-IOV specification can be used to reduce the CPU impact of high throughput workloads by bypassing the virtualization intermediary. The term "single root" refers to a single root complex as contrasted with a multiple root complex. In a PCI Express system, a root complex device couples the processor and memory subsystem to a PCI Express switch fabric comprised of one or more switch devices. The root complex generates transaction requests on behalf of the processor, which is interconnected through a local bus.

Figure 5:
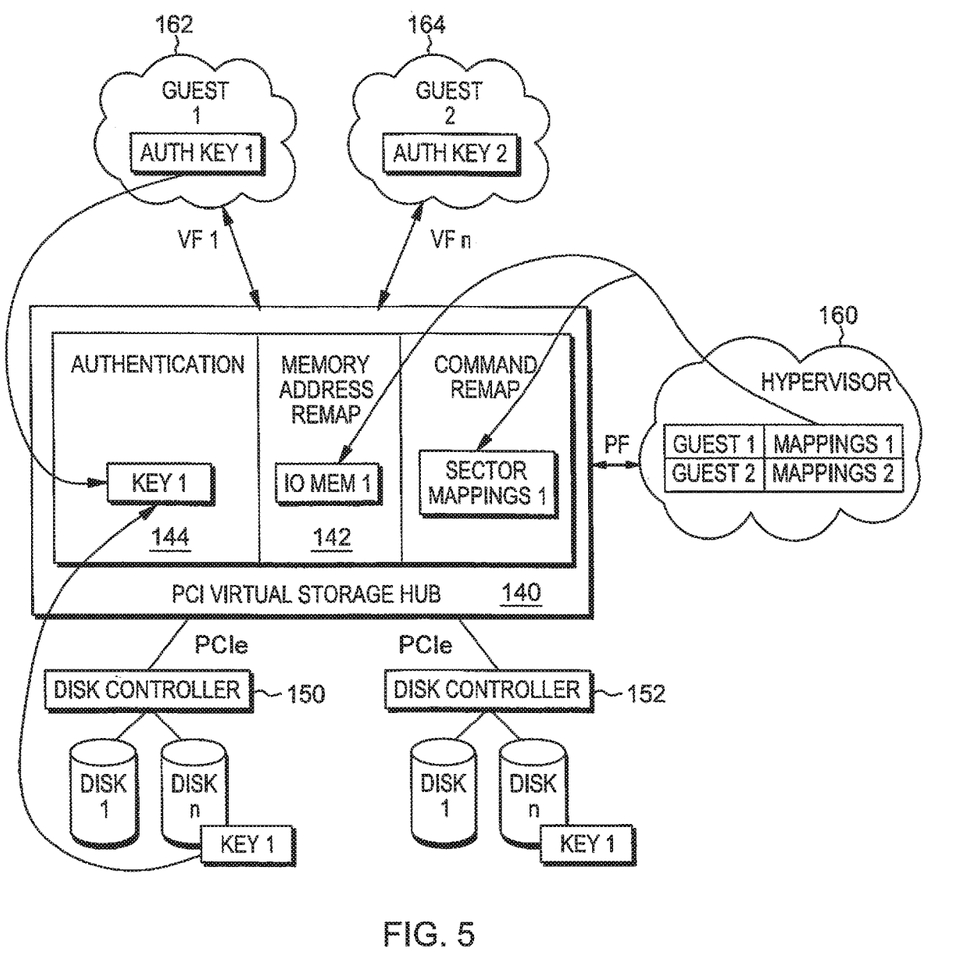
FIG. 5 shows an architecture, in accordance with an embodiment of the invention, for using storage devices in a virtualized environment.

FIG. 5 illustrates an architecture that may be used, in embodiments of the invention, to provide virtual disk to a guest using SR-IOV. For that, a storage PCIe hub 140 is defined that is a PCIe endpoint with a single physical function (PF) and multiple virtual functions (VFs). The PCIe hub includes an address mapping unit 142, an authentication unit 144 and multiple PCIe ports to connect to existing PCIe storage controllers 150, 152. The storage PCIe hub controls the connected PCIe storage controllers and provides all means for the initialization of the controllers including the initial capability scan and disk discovery. This information will be reflected to the hypervisor 160 over the PF of the PCIe hub when the hypervisor does its disk discovery during boot.

When a guest 162, 164 is created, a VF of the storage PCIe hub 160 is assigned to the virtual machine as a generic storage device. At first boot, the guest will send a specific request block over the VF's mmio space to the storage PCIe hub. This request control block includes the guest parameters for the disk such as size and QoS (IOPS) and also an authentication key for the requested virtual disk. The VF will trigger, as action to this request block, an interrupt from the PF of the PCIe storage hub to the hypervisor.

Over PCIe methods on the PF, the hypervisor 160 will then retrieve the data of the request block and grant or reject the request based on the allowance of the guest. On grant, the hypervisor will send a configuration command block over the PF to the storage PCIe hub 140 containing the QoS and the mapping from blocks of the physical disk. The mapping will be cached inside the storage PCIe hub for dynamic mapping of DMAs to the guests. Besides the mapping, the authentication key, in embodiments of the invention, is stored on the disks for fault tolerance. After this is finished, an interrupt is presented to the requesting guest which will retrieve the status by PCIe means.

For subsequent boots, the guest will send to the VF the authentication key in a command block requesting access only. The storage PCIe hub hardware and firmware will present an interrupt to the hypervisor and provide the request for mapping. The hypervisor will respond with PCIe means to set up the mappings in the storage PCIe hub. After that, an interrupt is presented to the guest and the response block is provided over the VF of the guest.

Once the authentication set up is done, the vdisk can be accessed directly from the guest without intervention of the hypervisor. The storage PCIe hub implements the per vdisk mapping of logical vdisk blocks to physical disk blocks while enforcing QoS. Those blocks mapped to the guest are only visible and accessible to those guests containing the authentication key. Since the access to the vdisk is done over the authentication key, multiple guests or the hypervisor can access the vdisk in order to do backup and other maintenance related functions.

Figure 6:
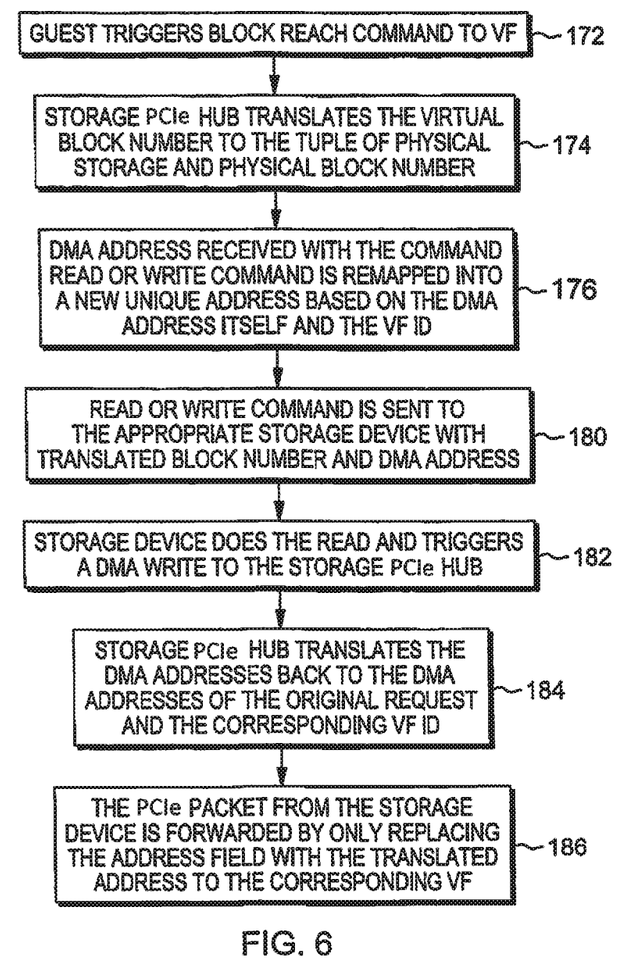
FIG. 6 illustrates a method that may be used, in an embodiment of the invention, for providing a virtual disk to a guest.

FIG. 6 illustrates a mechanism for providing virtual disk to the guest. At 172, the guest triggers a block read command to a VF of the storage PCIe hub; and at 174, the storage PCI hub translates the virtual block number of the tuple of physical storage device and physical block number. At 176, the DMA address coming with the command read, or a command write, is remapped into a new unique address based on the DMA address itself and the VF identification.

The read or write command is, at 180, sent to the appropriate storage device with the translated block number and the direct memory access (DMA) address. The storage device, at 182, does the read and triggers a DMA write to the storage PCIe hub. At 184, the storage PCIe hub translates the DMA addresses back to the DMA addresses of the original request and the corresponding VF identification. At 186, the PCIe packet from the storage device is forwarded by only replacing the address field with the translated address to the corresponding VF.

The write mechanism is analogous using the same mapping facilities.

While it is apparent that embodiments of the invention herein disclosed are well calculated to fulfill the features discussed above, it will be appreciated that numerous modifications and embodiments may be devised by those skilled in the art, and it is intended that the appended claims cover all such modifications and embodiments as fall within the true spirit and scope of the present invention.

The invention claimed is:

1. A method of providing a guest with access to a virtual storage on a physical storage using a peripheral component interface hub and a hypervisor, the peripheral component interface hub including multiple ports to storage controllers, the method comprising:
   at an initial boot of the guest, the peripheral component interface hub receiving from the guest a request to access the physical storage, the request including guest parameters and physical addresses of the physical storage;
   the peripheral component interface hub sending specified information about the request to the hypervisor;
   the peripheral component interface hub receiving from the hypervisor a configuration command including a mapping of addresses from the physical storage to addresses from the virtual storage;
   the peripheral component interface hub caching the mapping of addresses from the physical storage to addresses from the virtual storage;
   at subsequent boots of the guest, the peripheral component interface hub receiving from the guest a block read command, including a direct memory access (DMA) address, from a virtual function of the peripheral component interface hub;
   the peripheral component interface hub mapping the DMA address into a translated block and sending the block read command to a physical storage controller;
   the physical storage controller performing a read and triggering a DMA write to the peripheral component interface hub; and
   the peripheral component interface hub forwarding a packet to the guest.

2. The method according to claim 1, wherein the peripheral component interface hub mapping the DMA address into a translated block includes the peripheral component interface hub mapping the DMA address into a translated block based on the DMA address.

3. The method according to claim 1, wherein the peripheral component interface hub mapping the DMA address into a translated block includes the peripheral component interface hub mapping the DMA address into a translated block based on the DMA address and an identification of the virtual function.

4. The method according to claim 1, wherein the peripheral component interface hub forwarding a packet to the guest includes the peripheral component interface hub translating a DMA address from the storage controller into the DMA address in the block read command.

5. The method according to claim 1, wherein the peripheral component interface hub forwarding a packet to the guest includes the peripheral component interface hub translating a DMA address from the storage controller into the DMA address in the block read command and an address to the virtual function.

6. The method according to claim 5, wherein the peripheral component interface hub forwarding a packet to the guest further includes replacing an address field with the translated address to the virtual function.

7. The method according to claim 1, wherein the peripheral component interface hub further includes a plurality of virtual functions, and the method further comprises:
   assigning the guest one of the virtual functions.

8. The method according to claim 7, wherein the peripheral component interface hub sending specified information about the request to the hypervisor includes the assigned virtual function triggering an interrupt to the hypervisor.

9. The method according to claim 1, wherein the peripheral component interface hub further includes a physical function connecting the peripheral component interface hub with the hypervisor.

10. The method according to claim 9, wherein:
    the peripheral component interface hub sending specified information about the request to the hypervisor includes the peripheral component interface hub sending said specified information over the physical function to the hypervisor.

11. A system for providing a guest with access to a virtual storage on a physical storage, the system comprising:
    a peripheral component interface hub for receiving from the guest, at an initial boot of the guest, a request to access the physical storage, the request including guest parameters and physical addresses of the physical storage; for sending specified information about the request to a hypervisor; for receiving from the hypervisor a configuration command including a mapping of addresses from the physical storage to addresses from the virtual storage; and for caching the mapping of addresses from the physical storage to addresses from the virtual storage, and storing an authentication key on the storage controllers; and wherein:
    for subsequent boots of the guest, the peripheral component interface hub receives from the guest a block read command, including a direct memory access (DMA) address, from a virtual function of the peripheral component interface hub; the peripheral component interface hub maps the DMA address into a translated block and sends the block read command to a physical storage controller; the physical storage controller performs a read and triggers a DMA write to the peripheral component interface hub; and the peripheral component interface hub forwards a packet to the guest.

12. The system according to claim 11, wherein the peripheral component interface hub maps the DMA address into a translated block includes the peripheral component interface hub mapping the DMA address into a translated block based on the DMA address.

13. The system according to claim 11, wherein the peripheral component interface hub maps the DMA address into a translated block includes the peripheral component interface hub mapping the DMA address into a translated block based on the DMA address and an identification of the virtual function.

14. The system according to claim 11, wherein the peripheral component interface hub forwards a packet to the guest includes the peripheral component interface hub translating a DMA address from the storage controller into the DMA address in the block read command.

15. The method according to claim 11, wherein the peripheral component interface hub forwards a packet to the guest includes the peripheral component interface hub translating a DMA address from the storage controller into the DMA address in the block read command and an address to the virtual function.

16. An article of manufacture comprising:
at least one non-transitory, tangible computer readable hardware device having computer readable program code logic tangibly embodied therein to provide a guest with access to a virtual storage on a physical storage using a peripheral component interface hub, the computer readable program code logic, when executing on a computer, performing the following:
at an initial boot of the guest, receiving, by the peripheral component interface hub, from the guest a request to access the physical storage, the request including guest parameters and physical addresses of the physical storage;
sending, by the peripheral component interface hub, specified information about the request to the hypervisor;
receiving, by the peripheral component interface hub, from the hypervisor a configuration command including a mapping of addresses from the physical storage to addresses from the virtual storage;
caching, by the peripheral component interface hub, the mapping of addresses from the physical storage to addresses from the virtual storage;
at subsequent boots of the guest, receiving, by the peripheral component interface hub, from the guest a block read command, including a direct memory access (DMA) address, from a virtual function of the peripheral component interface hub;
mapping, by the peripheral component interface hub, the DMA address into a translated block and sending, by the peripheral component interface hub, the block read command to a physical storage controller;
performing, by the physical storage controller, a read and triggering a DMA write to the peripheral component interface hub; and
forwarding, by the peripheral component interface hub, a packet to the guest.

17. The article of manufacture according to claim 16, wherein the peripheral component interface hub mapping the DMA address into a translated block includes the peripheral component interface hub mapping the DMA address into a translated block based on the DMA address.

18. The article of manufacture according to claim 16, wherein the peripheral component interface hub mapping the DMA address into a translated block includes the peripheral component interface hub mapping the DMA address into a translated block based on the DMA address and an identification of the virtual function.

19. The article of manufacture according to claim 16, wherein the peripheral component interface hub forwarding a packet to the guest includes the peripheral component interface hub translating a DMA address from the storage controller into the DMA address in the block read command.

20. The article of manufacture according to claim 16, wherein the peripheral component interface hub forwarding a packet to the guest includes the peripheral component interface hub translating a DMA address from the storage controller into the DMA address in the block read command and an address to the virtual function.

* * * * *